United States Patent
Sako et al.

(10) Patent No.: US 7,956,276 B2
(45) Date of Patent: Jun. 7, 2011

(54) METHOD OF DISTRIBUTING MASHUP DATA, MASHUP METHOD, SERVER APPARATUS FOR MASHUP DATA, AND MASHUP APPARATUS

(75) Inventors: Yoichiro Sako, Tokyo (JP); Yasushi Miyajima, Kanagawa (JP); Mitsuru Takehara, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/978,866

(22) Filed: Oct. 30, 2007

(65) Prior Publication Data

US 2008/0127812 A1 Jun. 5, 2008

(30) Foreign Application Priority Data

Dec. 4, 2006 (JP) .............................. P2006-326437

(51) Int. Cl.
G10H 1/08 (2006.01)
(52) U.S. Cl. ................. 84/625; 84/609; 84/611; 84/622
(58) Field of Classification Search .................... 84/609, 84/611, 625, 622
See application file for complete search history.

(56) References Cited

U.S. PATENT DOCUMENTS

| | | | | |
|---|---|---|---|---|
| 6,835,884 B2 * | 12/2004 | Iwamoto et al. | ................. | 84/609 |
| 7,351,904 B2 * | 4/2008 | Tamori | ............................. | 84/609 |
| 7,596,234 B2 * | 9/2009 | Lu et al. | ......................... | 381/119 |
| 7,626,112 B2 * | 12/2009 | Miyajima | ....................... | 84/609 |
| 2001/0029832 A1 * | 10/2001 | Kanda et al. | .................... | 84/609 |
| 2002/0010740 A1 * | 1/2002 | Kikuchi et al. | ................ | 709/203 |
| 2002/0166440 A1 * | 11/2002 | Herberger et al. | ............... | 84/625 |
| 2004/0007120 A1 * | 1/2004 | Futamase et al. | ................ | 84/622 |
| 2004/0159221 A1 * | 8/2004 | Camiel | ............................ | 84/660 |
| 2004/0254660 A1 * | 12/2004 | Seefeldt | ........................... | 700/94 |
| 2006/0107822 A1 * | 5/2006 | Bowen | ............................. | 84/612 |
| 2006/0265657 A1 * | 11/2006 | Gilley | ............................. | 715/730 |
| 2007/0012163 A1 * | 1/2007 | Ijichi | ............................... | 84/600 |
| 2007/0074617 A1 * | 4/2007 | Vergo | .............................. | 84/612 |
| 2007/0094139 A1 * | 4/2007 | Martinez | ......................... | 705/40 |
| 2007/0119292 A1 * | 5/2007 | Nakamura | ...................... | 84/610 |
| 2007/0137466 A1 * | 6/2007 | Lindemann | ..................... | 84/626 |
| 2007/0209498 A1 * | 9/2007 | Lindgren et al. | ................ | 84/609 |
| 2007/0261537 A1 * | 11/2007 | Eronen et al. | ................... | 84/611 |
| 2007/0285815 A1 * | 12/2007 | Herre et al. | ..................... | 360/13 |
| 2008/0071929 A1 * | 3/2008 | Motte et al. | ................... | 709/246 |

(Continued)

FOREIGN PATENT DOCUMENTS

EP 1503381 2/2005

(Continued)

OTHER PUBLICATIONS

European Search Report, EP 07 12 1978.

*Primary Examiner* — Walter Benson
*Assistant Examiner* — Kawing Chan
(74) *Attorney, Agent, or Firm* — Lerner, David, Littenberg, Krumholz & Mentlik, LLP (57) ABSTRACT

A method of distributing mashup data for mashing up at least a first content and a second content. The method includes the step of distributing to a user, through a network, a data file having first data for dividing the first content and the second content into a plurality of blocks in accordance with individual contents, respectively, and second data indicating a disposition sequence for disposing the plurality of blocks in a predetermined sequence to create a new content.

2 Claims, 12 Drawing Sheets

U.S. PATENT DOCUMENTS

| | | | |
|---|---|---|---|
| 2008/0072261 A1* | 3/2008 | Ralston et al. | 725/62 |
| 2008/0086689 A1* | 4/2008 | Berkley et al. | 715/731 |
| 2008/0184288 A1* | 7/2008 | Lipscomb | 725/32 |
| 2009/0019995 A1* | 1/2009 | Miyajima | 84/625 |
| 2009/0044689 A1* | 2/2009 | Komori et al. | 84/625 |
| 2009/0133568 A1* | 5/2009 | Miyajima et al. | 84/625 |

FOREIGN PATENT DOCUMENTS

| | | |
|---|---|---|
| EP | 1524667 | 4/2005 |
| JP | 2006-107693 A | 4/2006 |
| WO | 2006127951 | 11/2006 |
| WO | 2008065808 | 6/2008 |

* cited by examiner

Xxx Carey
Xxx Be My Baby (79.931 BPM 84 bars) } 13A

F#

| Intro | | | | | | | | A | | | | |
|---|---|---|---|---|---|---|---|---|---|---|---|---|
| VIm7 (D#m7) | II7 (G#7) | VM7 (C#m7) | VIM7 (F#M7) | II7 (G#7) | Vm7 (C#7) | IM7 (F#M7) | V7 (C#7) | IM7 (F#M7) | VIm7 (D#m7) | IIm7 (G#7) | Vm7 (C#7) | IM7 (F#M7) |

TRKTBL TRACK TABLE

| | |
|---|---|
| NUMBER OF TRACKS | # Num |
| FIRST TRACK 11A | |
| NUMBER OF BLOCKS | #A0 |
| DATA OF FIRST BLOCK BLK_A1 | #A1 |
| DATA OF SECOND BLOCK BLK_A2 | #A2 |
| DATA OF THIRD BLOCK BLK_A3 | #A3 |
| ... | |
| SECOND TRACK 11B | |
| NUMBER OF BLOCKS | #B0 |
| DATA OF FIRST BLOCK BLK_B1 | #B1 |
| DATA OF SECOND BLOCK BLK_B2 | #B2 |
| DATA OF THIRD BLOCK BLK_B3 | #B3 |
| ... | |

A brackets #A0–#A3; #B brackets #B0–#B3.

FIG. 6B

DATA OF #Ai AND #Bj

| # | Field | |
|---|---|---|
| 1 | MUSIC ID | DATA ON ORIGINAL MUSIC |
| 2 | BLOCK ORIGINAL (TEMPO) | |
| 3 | BLOCK BEAT | |
| 4 | BLOCK KEY AND SCALE | |
| 5 | SAMPLE START POINT/END POINT IN BLOCK ORIGINAL MUSIC | |
| 6 | START-POINT BEAT COUNT | |
| 7 | END-POINT BEAT COUNT | |
| 8 | SAMPLE POSITION INDICATING THE BEGINNING OF BAR IMMEDIATE BEFORE START POINT | |
| 9 | SAMPLE POSITION INDICATING THE BEGINNING OF BAR IMMEDIATE BEFORE END POINT | |
| 10 | START SAMPLE POSITION ON MASHUP | DATA ON MASHUP RESULT |
| 11 | END SAMPLE POSITION ON MASHUP | |
| 12 | START BAR NUMBER ON MASHUP | |
| 13 | END BAR NUMBER ON MASHUP | |

METHOD OF DISTRIBUTING MASHUP DATA, MASHUP METHOD, SERVER APPARATUS FOR MASHUP DATA, AND MASHUP APPARATUS

CROSS-REFERENCE TO RELATED APPLICATIONS

The present application claims priority from Japanese Patent Application No. JP 2006-326437, filed in the Japanese Patent Office on Dec. 4, 2006, the entire content of which is incorporated herein by reference.

BACKGROUND OF THE INVENTION

1. Field of the Invention

This invention relates to a method of distributing mashup data, a mashup method, a server apparatus for mashup data, and a mashup apparatus.

2. Description of the Related Art

Processing which puts a part of or all of plural pieces of music together is called a remix. As one type of a remix, there is a "mashup", which performs more advanced processing. In the mashup, when a piece of music A and a piece of music B are remixed, a new piece of music is created by matching the tempo (performance speed of music) of both music, the number of beats (for example, the number of quarter notes), a key (a pitch of a fundamental note, such as C major, D minor, etc.), a chord progression (changing state of a chord), etc., and cutting and pasting only a seemly suitable section.

The mashup has been widely recognized, and pieces of music created by mashups are also used actively for broadcasting, etc.

Related art documents include, for example Japanese Unexamined Patent Application Publication No. 2006-107693.

SUMMARY OF THE INVENTION

However, in order to carry out a mashup, it is necessary for the user to have rich knowledge of music. Thus, there are many listeners (users) who desire to get mashup-result music. Also, when a new piece of music is created by mashing up a piece of music, the copyright of the original music might be infringed.

The present invention addresses the above-identified and other problems.

According to an embodiment of the present invention, there is provided a method of distributing mashup data for mashing up at least a first content and a second content, the method including the step of distributing to a user, through a network, a data file having first data for dividing the first content and the second content into a plurality of blocks in accordance with individual contents, respectively, and second data indicating a disposition sequence for disposing the plurality of blocks in a predetermined sequence to create a new content.

By this invention, it is possible to carry out a mashup without having special knowledge for a mashup. Also, it is possible to distribute data for obtaining the mashup result through a network free of charge or with a charge. In that case, the original music (the music to be used for a mashup) is provided by the user who are going to listen to the mashup-result music. Also, the original music is only played back in accordance with the data for a mashup, and thus there is little possibility that the copyright is infringed. It would rather contribute to the sales of the original music.

DESCRIPTION OF THE PREFERRED EMBODIMENTS

1. Display Example at Mash-Up Time

Figure 1:
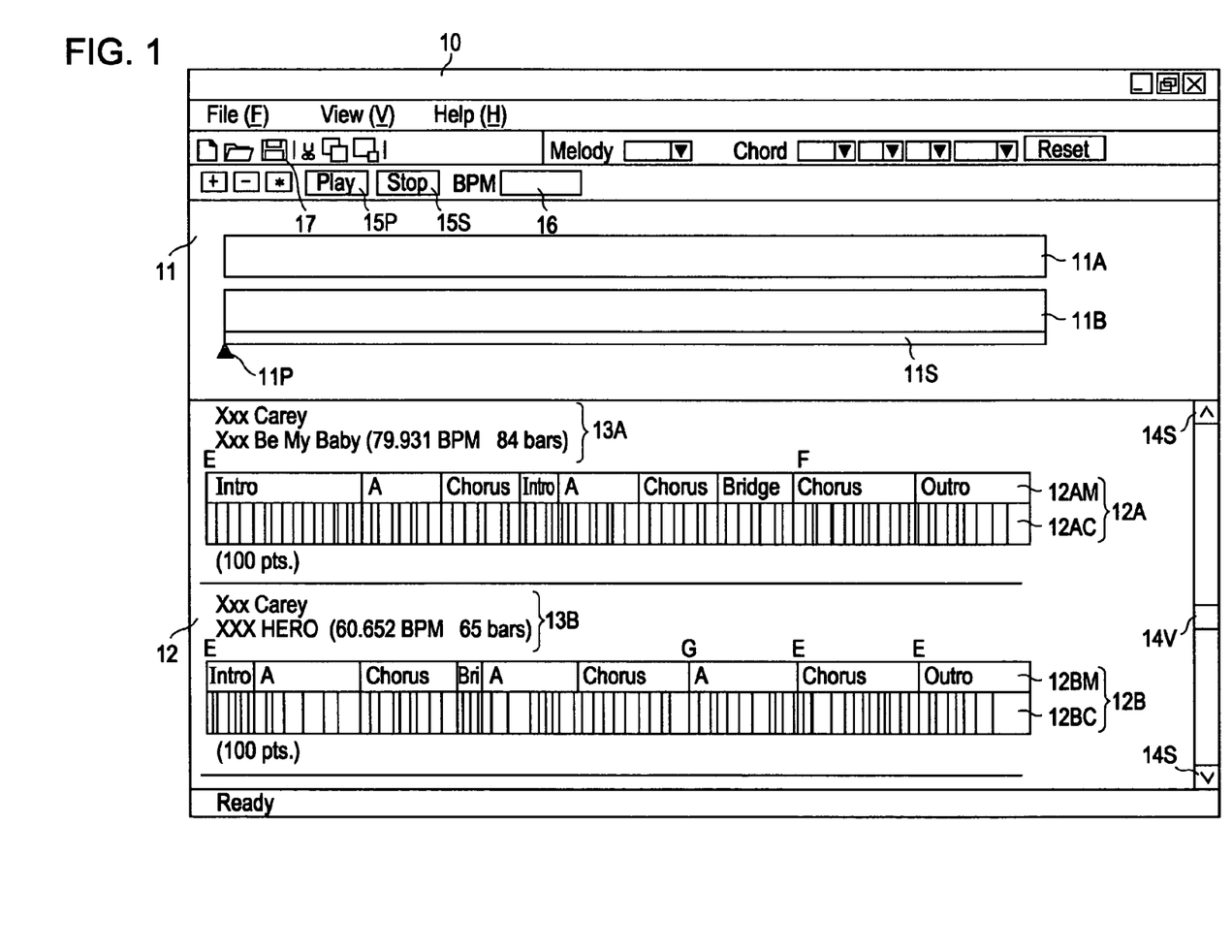
FIG. 1 is a form of a display screen according to an embodiment of the present invention.
Figure 2:
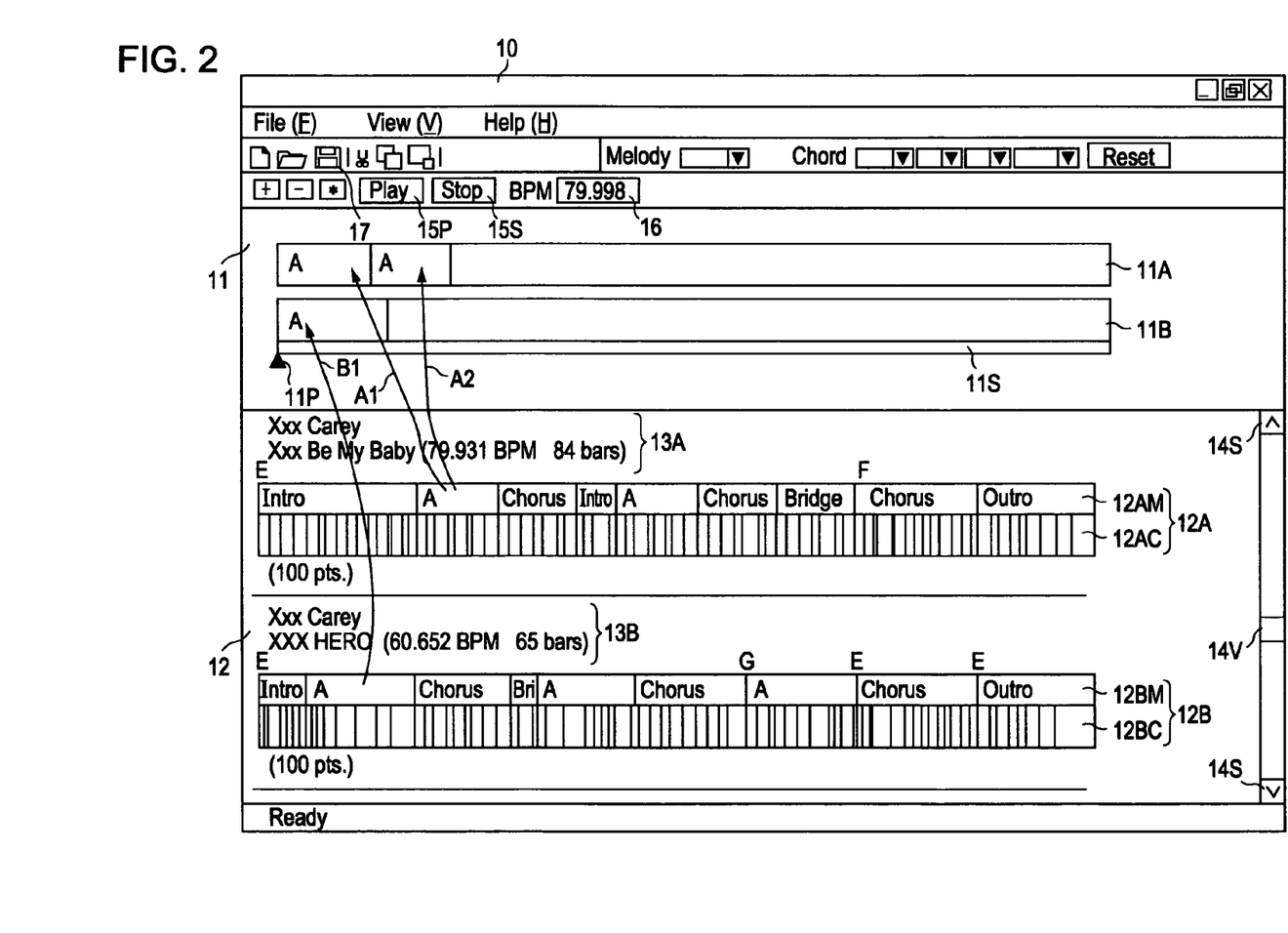
FIG. 2 is a form of a display screen according to an embodiment of the present invention.
Figure 3:
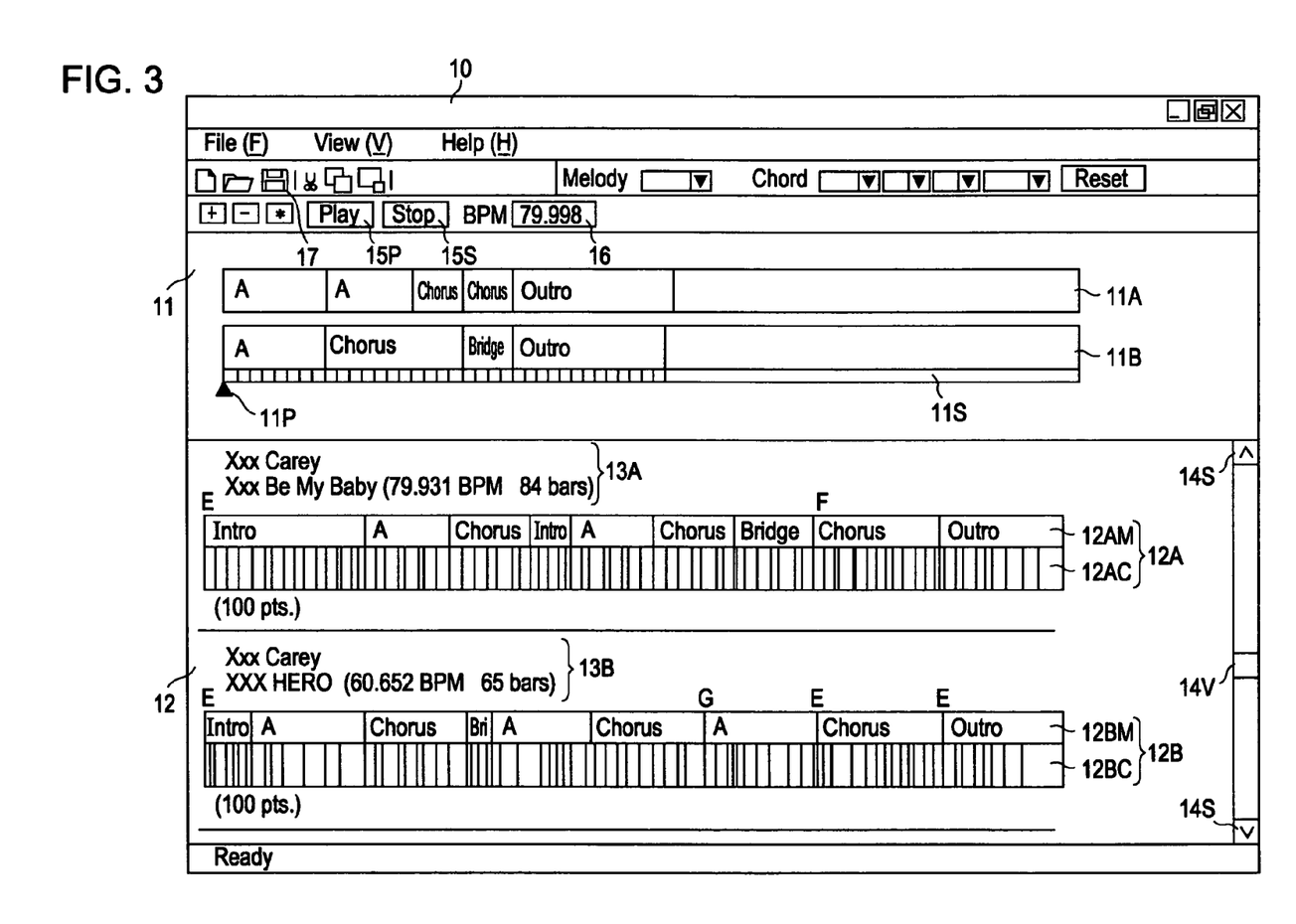
FIG. 3 is a form of a display screen according to an embodiment of the present invention.

FIGS. 1 to 3 shows a display example of display screens in the case of performing a mashup. In this example, a new piece of music is mashed up from a plurality of pieces of music, for example two pieces of music A and B using a personal computer. In this regard, in the following, a piece of music (to be a material) to be used for a mashup is called an "original music", and the result music made by the mashup is called a "mashup music". Also, a section which can be separated from the music, such as an intro of the music, an A-melody, a B-melody, a chorus, an interlude, and an outro, etc., is called a "block".

In FIGS. 1 to 3, reference numeral 10 denotes a display screen at the time of a mashup. FIG. 1 is a screen at the start time of the mashup, FIG. 2 is a screen in the process of the mashup, and FIG. 3 is a screen at the end time of the mashup.

The display screen 10 is divided into two parts, an upper edit area 11 and a lower material area 12. In the upper edit area 11, information on a piece of mashup music (a piece of the mashup-result music) is displayed. In the lower material area 12, information on original pieces of music (pieces of music to be used for a mashup) A and B are displayed.

Thus, the edit area 11 is provided with a belt-shaped area 11A to which the original music A is copied and a belt-shaped area 11B to which the original music B is copied. These areas 11A and 11B are provided in the area 11 so as to be parallel with each other and to have their horizontal directions equal to a time axial direction. In this regard, in the following, the areas 11A and 11B are called tracks 11A and 11B, respectively by being likened to a magnetic tape.

Also, a performance-time scale 11S is displayed under the track 11B, and a pointer 11p indicating a time position at performance time is displayed at the start point of the performance-time scale 11S.

Further, a belt-shaped track 12A indicating the information on the original music A and a belt-shaped track 12B indicating the information on the original music B are formed in the material area 12 so as to be parallel with each other and to have their horizontal directions equal to a time axial direction. Although FIG. 1 is an initial screen, FIG. 1 shows a state in which the tracks 12A and 12B are provided with the information on the original pieces of music A and B, respectively (when the information is not provided, they are empty in the same manner as the tracks 11A and 11B).

Figure 4:
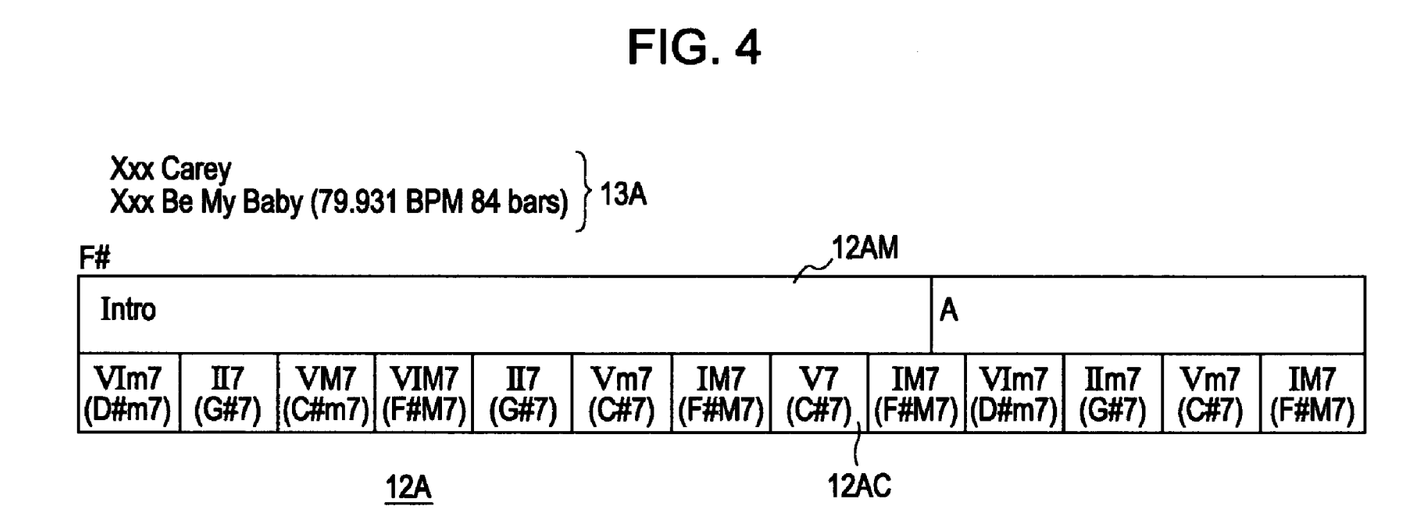
FIG. 4 is an enlarged diagram illustrating an example of a display content.

In this case, the track 12A is divided into two tracks, namely an upper track 12AM called a "melody track" and a lower track 12AC called a "code track". The melody track 12AM is separated into blocks, namely, an intro of the original music, an A-melody, a B-melody, a chorus, an interlude, and an outro, etc., and each block is provided with the corresponding melody data. Also, as shown in FIG. 4 by the time axis (in horizontal direction) being enlarged, the code track 12AC is separated into blocks in accordance with the code progression of the original music, and each block is provided with the corresponding code data.

Furthermore, the track 12B has the same structure as that of the track 12A. The melody track 12BM is separated into the blocks of the original music, and is provided with the corresponding melody data. The code track 12BC is separated into the blocks of the original codes, and is provided with the corresponding code data.

Also, as shown by reference numerals 13A and 13B, the artist names, the music names, the tempos, and the numbers of bars on the original pieces of music A and B are displayed at the upper part of the tracks 12A and 12B, respectively. Furthermore, in the case where there are three original pieces of music or more, the material area 12 is scrolled in the vertical direction by operating a scroll button 14S or a scroll bar 14V, displayed on the right side of the material area 12, and thus all the original music tracks 12A, 12B, can be used.

In this regard, in reality, in the case where the tracks 12AM and 12AC and the tracks 12BM and 12BC have different lengths in time, they are displayed to have the same length by being standardized, and each block is displayed by being separated by color depending on the contents. Also, the digital audio data of the original pieces of music A and B, and information displayed in the tracks 12A and 12B are provided in the personal computer in advance by obtaining, for example through a download site, the Internet, or the like.

Also, in the upper part of the display screen 10, a playback button 15P for test listening music during a mashup and the mashup result, a stop button 15S for stopping the playback, an input field for specifying a playback tempo, and a save button 17 for saving the information of the mashup result.

2. Mashup Method

In a display state as shown in FIG. 1, for example when as shown by an arrow A1 in FIG. 2, "A-melody", of the melody track 12AM of the original music A is dragged and dropped, or copied and pasted to the beginning of the track 11A, the "A-melody" of the original music A is copied to the beginning of the track 11A. FIG. 2 shows the case where the same "A-melody" is repeatedly copied to the track 11A as shown by an arrow A2.

Also, in FIG. 2, when as shown by an arrow B1, "A-melody" of the melody track 12BM of the original music B is dragged and dropped, or copied and pasted to the beginning of the track 11B, the "A-melody" of the original music B is copied to the beginning of the track 11B.

After this, by performing the similar operation, any block of the tracks 12AM to 12BC is copied to the track 11A or 11B. As a result, the tracks 11A and 11B can have the contents as shown in FIG. 3, for example.

Thus, when the user clicks the playback button 15P, the music of the content created on the track 11A and the music of the content created on the track 11B are played back in a mixed state. Accordingly, the user can test listen to the mashup music.

Note that the playback of this mashup-result music is not produced by playing back the digital audio data of the mashup music itself. The music is reproduced by the blocks of the original music A and B being selectively taken out or processed in accordance with the data displayed on the tracks 11A and 11B.

If the user is not satisfied with the mashup music, the user should delete, copy, or move the unfavorite block of the tracks 11A and 11B using a mouse. Alternatively, the user can copy a new block from the tracks 12AM to 12BC. That is to say, the user can edit all the blocks of the tracks 11A and 11B.

In this manner, the user copies blocks from the tracks 12AM to 12BC, edits the tracks 11A and 11B, and test listens to the result. Thus, it is possible for the user to obtain the desired mashup music.

When a new piece of music is completed by the mashup, the user clicks the save button 17. Then, not the digital audio data of the mashup music itself, but the information (the data displayed on the tracks 11A and 11B) necessary for playing back the mashup music is stored, for example in a hard disk device as one file. That is to say, the information indicating the original pieces of music A and B, the blocks to be used out of the music A and B, the position in time and the sequence when the blocks are used, and the information on tempo, etc., are stored in the hard disk device as a file.

In this regard, when someone cooks, he or she prepares food materials in accordance with a recipe, and cooks the food materials by the procedure and the method indicated by a recipe. The above-described method of mashing up is similar to cooking. Thus, in the following, the information (in the above-described case, the information stored in the hard disk device when the save button 17 is clicked) necessary for a mashup is called a "recipe".

That is to say, if the digital audio data and the meta data of music is prepared in accordance with a recipe and the data is edited in accordance with the recipe, a piece of mashup music is created. In this regard, the mata data includes various data for creating a recipe, for example a temperature, a key, a beat, a chord, etc., in addition to general data (the data for identifying a piece of music, a music name, the name of an artist, etc.) of the corresponding music. Also, for the data for identifying a piece of music, in the case where the user has obtained the music from a CD, such data as the CD number of that CD, a label company (seller), an album name, the music name of the corresponding track, an ISRC, etc., can be used.

3. Playback of Mashup Music

In this case, the user prepares the digital audio data of the original pieces of music A and B, which are targeted, and the recipe thereof in a personal computer. Then, when the user executes the recipe program, the original pieces of music A and B are automatically processed in real time in accordance with the recipe, that is to say, for example in accordance with the tracks 11A and 11B as shown in FIG. 1, and the mashup music is output as sound.

4. Example of Data Structure in Recipe

Figure 5:
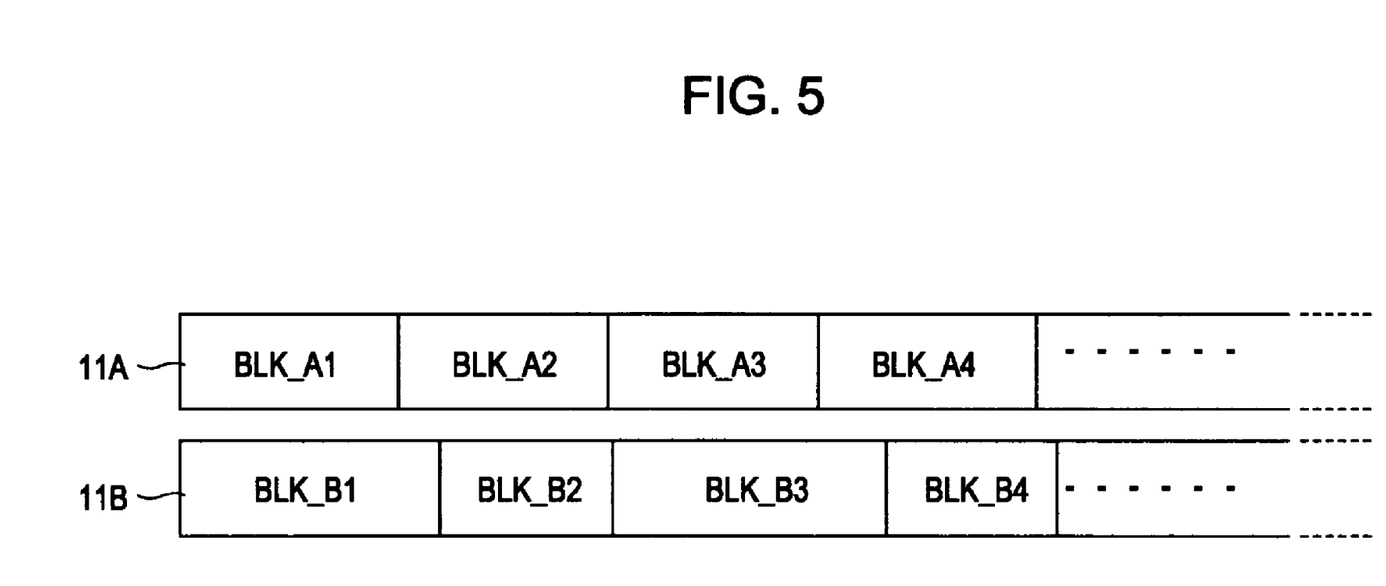
FIG. 5 is a diagram illustrating an example of a concept of data.

FIG. 5 is a diagram illustrating the concept of the tracks 11A and 11B. As a result of the mashup, the track 11A includes a plurality of blocks BLK_A1, BLK_A2, BLK_A3, . . . , and the track 11B includes a plurality of blocks BLK_B1, BLK_B2, BLK_B3, . . . . As shown in FIG. 5, the length (the length in time) of each block varies corresponding to the mashup. Also, the reference numerals of the blocks are sequential, but this does not necessarily mean that the blocks are sequential in the original music.

Figure 6A:
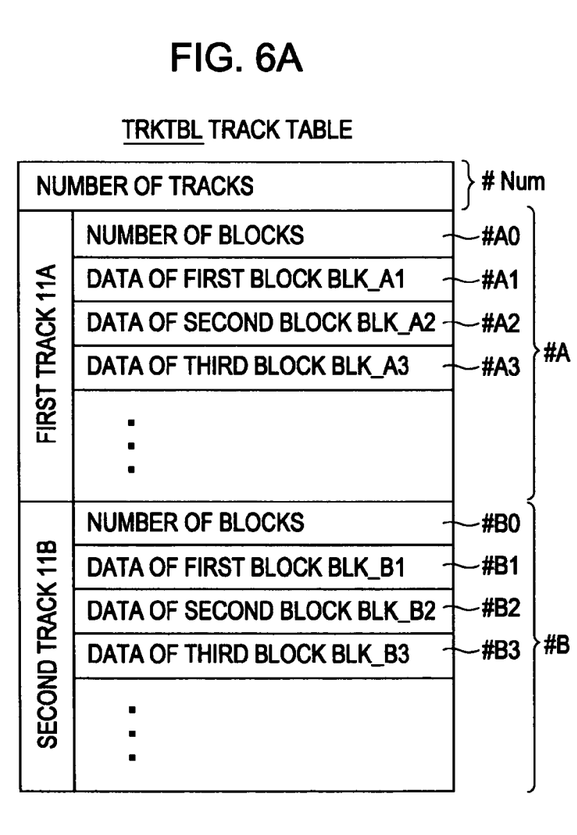
FIG. 6 is a diagram illustrating an example of a data table and a content thereof.

At this time, each block in the tracks 11A and 11B is defined, for example by the recipe shown in FIG. 6. That is to say, as shown in FIG. 6A, a track table TRKTBL is provided, and the table TRKTBL has a data area #NUM indicating the number of tracks 11A, 11B, . . . , in the edit area 11 of the display screen 10, and data areas #A, #B, . . . , indicating information on the blocks in the tracks 11A, 11B, . . . .

In the case of FIGS. 1 to 5, the number of tracks indicated by the data area #NUM is 2. Thus, the track table TRKTBL has the data area #A of the first track 11A and the data area #B of the second track 11B.

The data area #A of the first track 11A has a data field #A0 indicating the number of blocks of the first track 11A, and a data field #Ai indicating the information on each block BLK_Ai (i=1, 2, . . . ). These data fields #A0 and #Ai individually store relevant data.

Also, in the same manner, the data area #B of the second track 11B has a data field #B0 indicating the number of blocks of the second track 11B, and a data field #Bj indicating the information on each block BLK_Bj (j=1, 2, . . . ). After this, if there are a third track and more, the tracks are provided with the similar data area for individual tracks, and the data fields individually store relevant data.

Figure 6B:
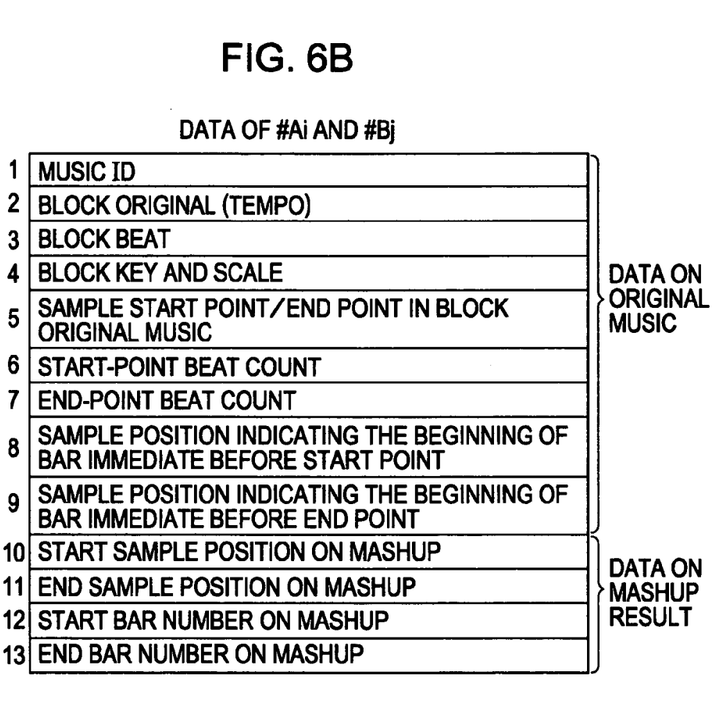

At this time, the data fields #Ai and #Bj of the data areas #A and #B store the data shown in FIG. 6B, for example. That is to say, in the data shown in FIG. 6B, the data of the first row to the ninth row is the information for the original music to be used for the mashup, and the data of the tenth row and after is the information on the music of the mashup result.

The "music ID" of the first row is an identification code for identifying an original piece of music (in this case, the original pieces of music A and B). Also, in general, the tempo of music is sometimes different for each block, and thus the "block original tempo" indicates the tempo in the block of the original music. The "block beat" indicates the beat of the block, such as one-two time, three-four time, etc.

Further, "block key and scale" of the fourth row is the information for modulation. It sometimes happens that original music is used for a mashup from the middle of a bar, or used until the middle of a bar, and thus "sample start point/end point in block original music" of the fifth row indicates the position of the start point or the end point, which is counted by sample unit in the original music. Also, "start-point beat count" of the fifth row and "end-point beat count" of the seventh row indicate the start and end of a bar and beat (for example, the third beat of the tenth bar) of the block, respectively, in the original music.

"Sample position indicating the beginning of bar immediate before start point" of the eighth row indicates the position of the beginning of the bar immediate before the start point to be used for a mashup, which is counted by sample unit in the original music. In the same manner, "sample position indicating the beginning of bar immediate before end point" of the ninth row indicates the position of the beginning of the bar immediate before the end point to be used for a mashup, which is counted by sample unit in the original music.

Accordingly, it is possible to know the parts (blocks) of the original music necessary for a mashup by the information of the first to the ninth rows.

Further, in FIG. 6B, "start sample position on mashup" of the tenth row and "end sample position on mashup" of the eleventh row indicate a boundary point between a certain block and the next block in a mashup music (for example, FIG. 5), that is to say, the start point and the end point of a certain block, which is counted by sample unit, respectively. Also, "start bar number on mashup" of the twelfth row and "end bar number on mashup" of the thirteenth row indicate the start and the end bar numbers of the mashup-result music, respectively.

Accordingly, it is possible to know the formation of a mashup by the blocks obtained from the original music by the information of the tenth to the thirteenth rows.

In this manner, by the track table TRKTBL shown in FIG. 6, it is possible to take out necessary blocks of the original music for a mashup for each sample unit, and to produce a new mashup music by assembling the blocks. That is to say, the track table TRKTBL becomes a recipe at the time of a mashup.

5. Recipe Distribution Method 5-1 Example of Recipe Distribution Method (No. 1)

Figure 7:
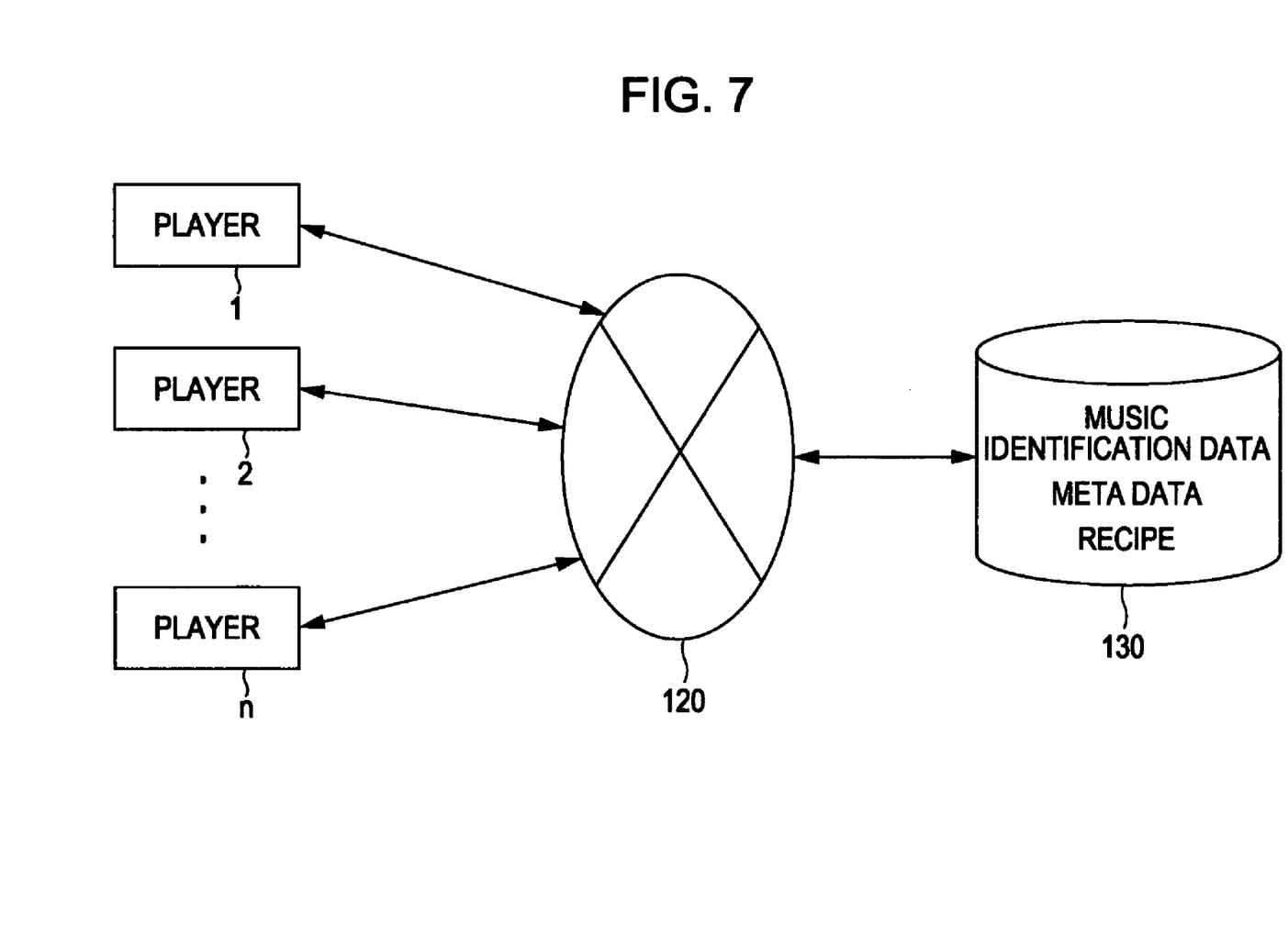
FIG. 7 is a diagram illustrating an example to which this invention is applied.

FIG. 7 illustrates an example of the recipe distribution method. Mashup players 1 to n are connected to a server 130 through a network 120. In this case, as described below, each of the players 1 to n can be constituted by a personal computer.

Also, the network 120 may be a dedicated line directly connected to the server 130, or the Internet may be interposed between the players and the server. Further, in this example, the server 130 stores identification data for identifying the music to be used for the original music, the meta data for using the music as the original music, and the recipes.

Figure 8:
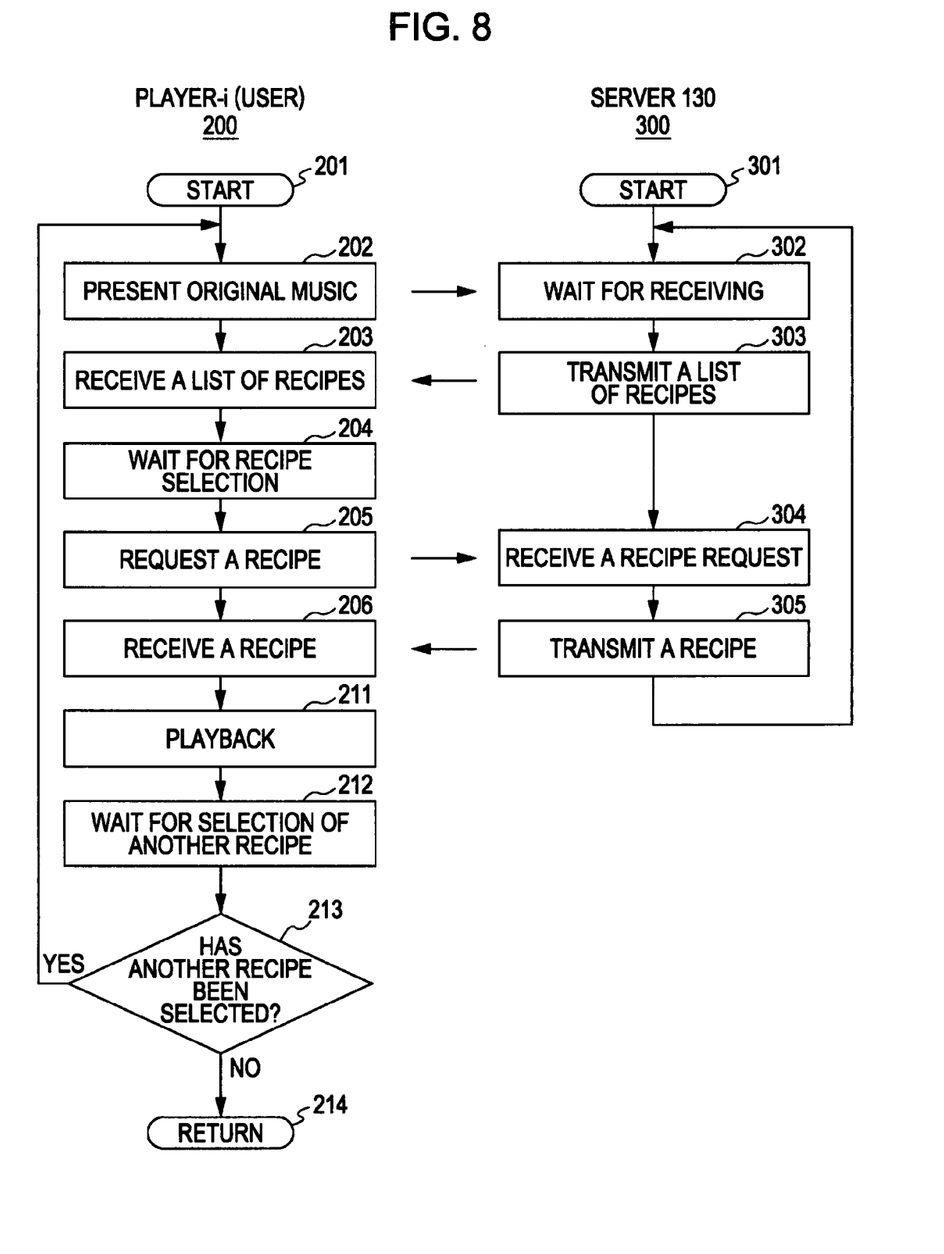
FIG. 8 is a flowchart illustrating an example of a data distribution method.

When the player i (i=1 to n) receives the distribution of a recipe from the server 130, for example a routine 200 as shown in FIG. 8 is executed by the player i, and a routine 300 is executed by the server 130. That is to say, in the server 130, the routine 300 is started from step 301, and then the processing waits for receiving an access from the players 1 to n in step 302.

When the routine 200 is executed in the player i, the routine 200 is started from step 201, and then in step 202, the original music to be used for a mashup is transmitted to the server 130 to be presented. The above-described identification data can be used for this presentation.

When the original music is presented by step 202, this is received by step 302. The processing of the server 130 proceeds to step 303, and a list of the recipe corresponding to the presented original music is transmitted to the player i.

Then, the list of the recipe is received by the player i to be displayed in step 203. In step 204, a selection of a desired recipe from the received list of recipes is waited. When a desired recipe is selected, in step 205, the request for the selected recipe is transmitted. This request is received in step 304, and in step 305, the server 130 transmits the recipe requested by step 205.

In step 206, the transmitted recipe is received and stored by the player i. In step 211, a mashup is executed in accordance with the recipe received and stored by step 206, and the music of the mashup result is played back.

When the playback is completed, in step 212, input of whether another recipe is necessary is waited. When inputted, in step 213, the input result of step 212 is determined. If inputted that another recipe is necessary, the processing returns from step 213 to step 202, and the above-described processing is repeated after that. In this regard, in the routine 300, the processing returns to step 302 subsequently to step 305 to be in a state of responding to a request from a player (including players other than the player i).

Also, in step 212, if inputted that another recipe is unnecessary, the processing proceeds from step 213 to step 214, and the routine 200 terminates.

In this manner, by the routines 200 and 300, it is possible for the server 130 to distribute the recipe requested by the user (player i) to that user.

5-2 Example of Recipe Distribution Method (No. 2)

Figure 9:
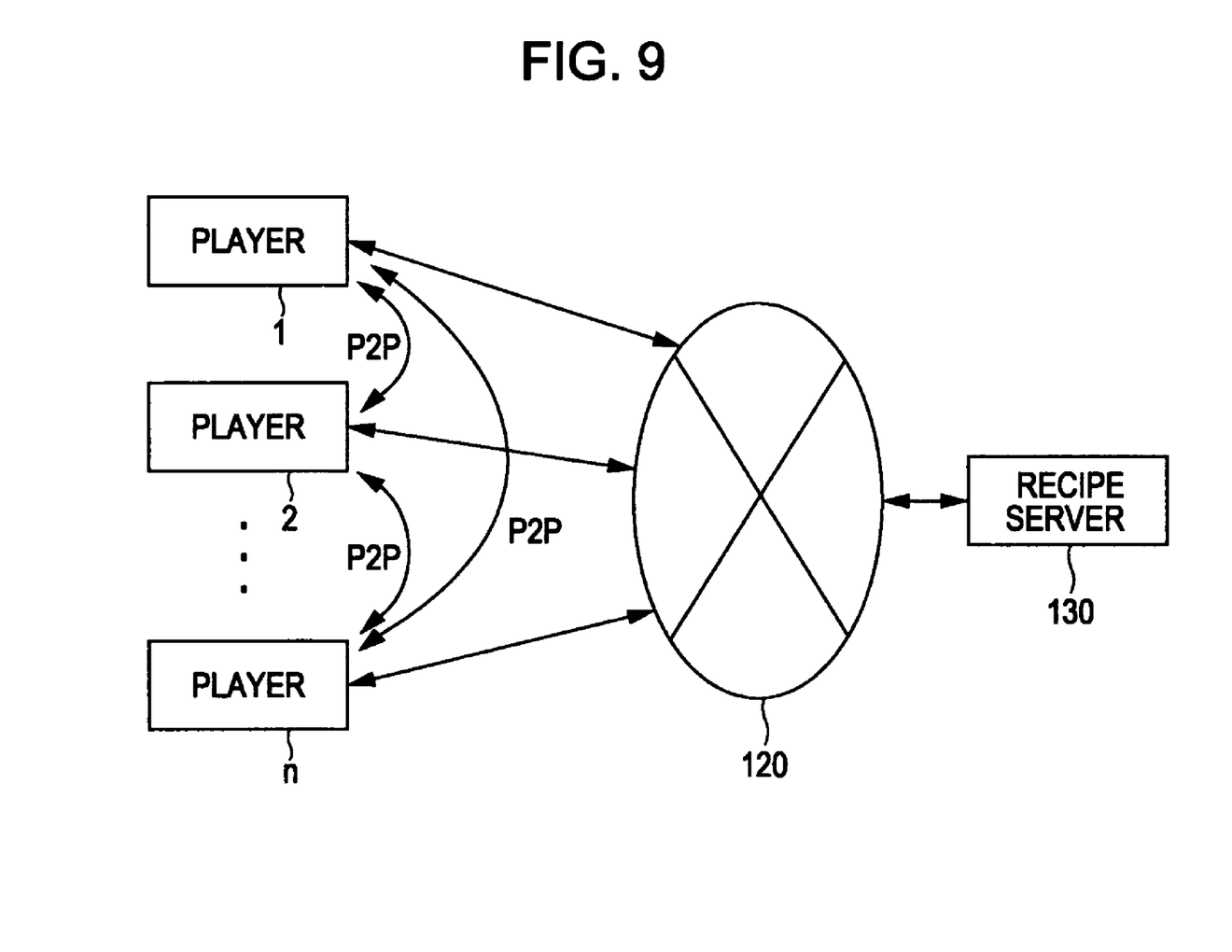
FIG. 9 is a diagram illustrating another example to which this invention is applied.

FIG. 9 illustrates another example of the recipe distribution method. In this example, a recipe can be received from the server 130, and at the same time, a recipe can be distributed among a plurality of players (users) 1 to n by P2P (Peer to Peer) communication.

5-3 Example of Recipe Distribution Method (No. 3)

Figure 10:
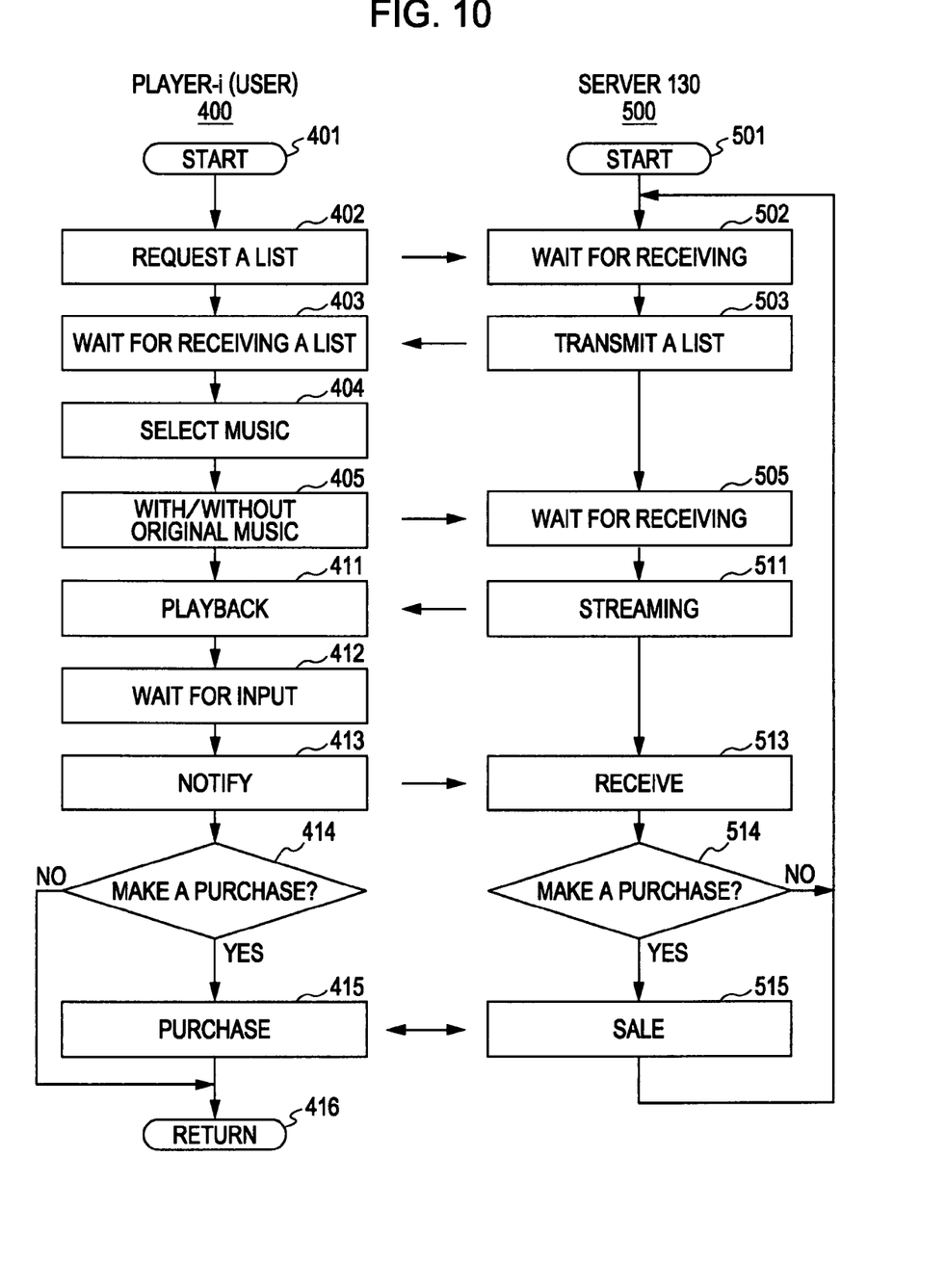
FIG. 10 is a flowchart illustrating another example of a data distribution method.

FIG. 10 illustrates still another example of the recipe distribution method. In this example, the server 130 distributes a recipe with a charge.

However, in 5-1 and the system in FIG. 7, the server 130 stores identification data for identifying the music to be used for the original music, the meta data for using the music as the original music, and the recipes. In this example, the server 130 further stores the digital audio data of the original music.

When the player i receives the distribution of a piece of mashup music from the server 130, for example a routine 400 as shown in FIG. 10 is executed by the player i, and a routine 500 is executed by the server 130. That is to say, in the server 130, the routine 500 is started from step 501, and then the processing waits for receiving an access from the players 1 to n in step 502.

When the routine 400 is executed in the player i, the routine 400 is started from step 401, and then in step 402, the transmission of a list of mashups is requested to the server 130.

When the list is requested by step 402, this is received by step 502. The processing of the server 130 proceeds to step 503, and a list of the mashup music is transmitted to the player i.

Then, the list is received by the player i, and is displayed in step 403. In step 404, a desired mashup music can be selected from the received list. When a desired mashup music is specified, the specification is transmitted in step 405, and is received in step 505.

Next, in step 511, for example the beginning 30-second part of the mashup music specified by steps 404 and 405 is transmitted to the player i in a stream format, and this is received by step 411. As a result, the player i plays back, in the streaming format, the beginning 30-second part of the mashup music specified by steps 404 and 405, that is to say, it becomes possible to test listen to the mashup music.

When the playback is completed, in step 412, the player i goes into an input state of whether the mashup music is purchased, and if purchased, whether the original music of the mashup music is also purchased. If this is input, in step 413, the input result of step 412 is transmitted to the server 130.

Then, in step 513, the server 130 receives the transmission from step 413, and in step 514, a determination is made on whether the mashup music is purchased, and if purchased, whether the original music of the mashup music is also purchased. If the mashup music is purchased, the processing proceeds from step 514 to step 515.

Also, the player i executes step 414 subsequently to step 413, and a determination is made on whether the input result of step 412 is a purchase of the mashup music. If it is a purchase, the processing proceeds from step 414 to step 415.

When in steps 515 and 415, the sales and the purchase processing of the mashup music selected in steps 404 and 405 is performed, that is to say, when the transmission and the reception of the recipe necessary for the mashup and the original music are sold and purchased, the digital-audio data file is transmitted and received, and the processing, such as the payment of the charge, etc., is performed.

In the routine 500, the processing returns to step 502 after that, and the routine 400 terminates in step 416.

Also, if the input result of step 412 is not a purchase, the processing proceeds from step 414 to step 416, and the routine 400 terminates. Further, in the routine 500, in step 514, if a determination is made that the mashup music is not purchased, the processing returns to step 502 from step 514.

In this manner, by the routines 400 and 500, if the mashup music is purchased, that mashup music can be test listened. By referring to the test listening result, it is possible for the user to determine whether to purchase the mashup music.

6. Hardware Example

Figure 11:
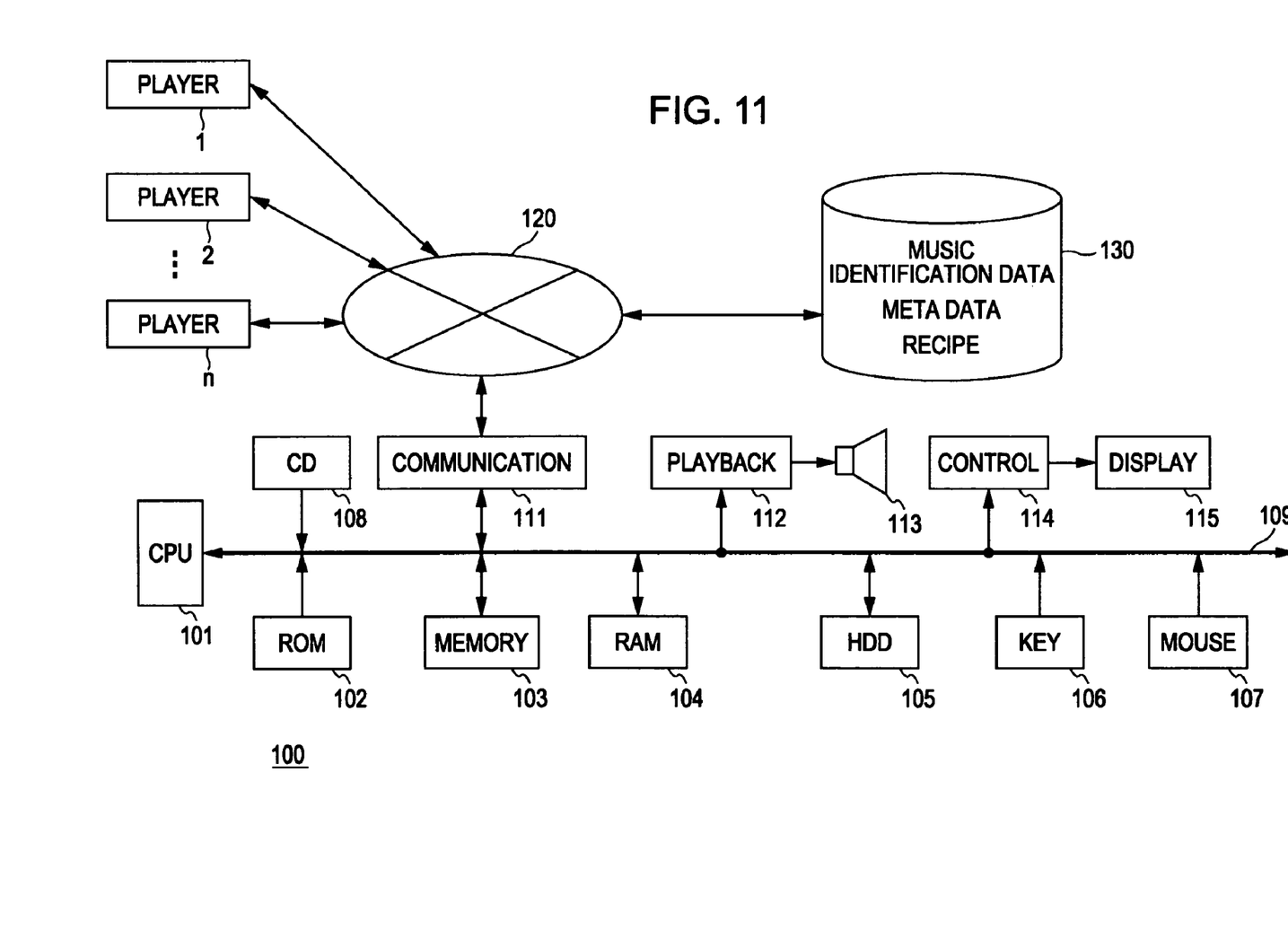
FIG. 11 is a diagram illustrating an example of a personal computer that can be used for this invention.

FIG. 11 illustrates an example of the case where the above-described player i is constituted by a personal computer 100 to achieve a mashup. That is to say, the personal computer 100 is constituted in the same manner as a general personal computer, and has a CPU 101, a ROM 102, a nonvolatile memory 103, and a RAM 104.

In this case, the CPU 101 executes various programs, and a BIOS executed by the CPU 101 and basic data are written in the ROM 102 and the memory 103. Also, the RAM 104 serves as a work area when the CPU 101 executes programs. These memories 102 to 104 are connected to the CPU 101 through a system bus 109.

Furthermore, a hard disk 105 is connected to the system bus 109 as a large capacity storage. In this case, for example as shown in FIG. 12, the hard disk 105 stores an OS for functioning this personal computer 100, a communication routine 200 or 400 for communicating with a server 130 in order to obtain necessary data for a mashup, a playback routine of mashup music, digital audio data of the original music to be mashed up, the meta data of the original music, and a recipe.

Also, a keyboard 106 and a mouse 107 are connected to the system bus 109 as a user interface, particularly for a character-input device and a pointing device, respectively. At the same time, a CD drive unit 108 is connected to the system bus 109 as an external input means for the digital audio data.

Furthermore, a communication interface circuit 111 is connected to the system bus 109, and the personal computer 100 is connected to an external network, for example the Internet 120 through the communication interface circuit 111. Moreover, a server 130 is connected to the network 120, and the server 130 stores the digital audio data of the original music described in FIG. 7 or FIG. 9, the identification data thereof, the meta data, the recipe, etc.

Figure 12:
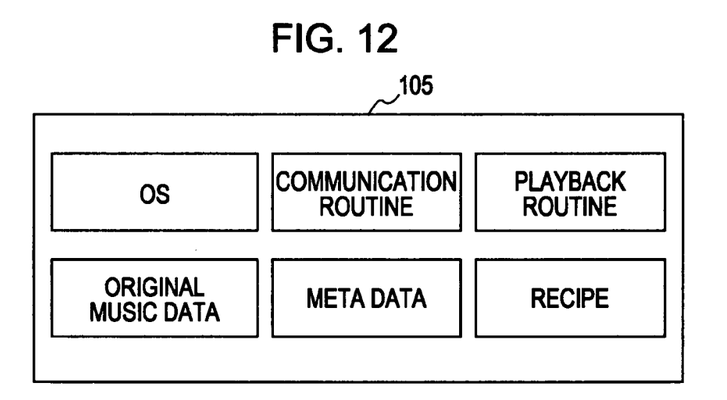
FIG. 12 is a diagram illustrating an example of data provided in a storage.

The digital audio data of the original music, the meta data thereof, and the recipe, which are stored in the server 130, are downloaded through the Internet 120, and further through the communication interface circuit 111, and then are stored in the hard disk 105 as shown in FIG. 12, for example.

Also, the personal computer 100 is provided with an audio playback circuit 112 and a display control circuit 114, and these circuits are also connected to the system bus 109. The audio playback circuit 112 performs decode processing, such as MP3 as necessary when digital audio data is supplied thereto, performs D/A conversion on the digital audio data into an analog audio signal, and supplies the analog audio signal to a speaker 113.

Furthermore, the display control circuit 114 has a video RAM, which is not shown in the figure. Display data is supplied to the video RAM, and at the same time, the video data is repeatedly read at a predetermined cycle to be converted into a video signal. The video signal is supplied to the display 115, and images are displayed as shown in FIGS. 1 to 3, etc.

Accordingly, if a distributed recipe is received by the method as described in 5, it is possible to playback the mashup music in accordance with the recipe as described in 3. Also, it is possible for the user to execute an additional mashup by himself/herself.

In this regard, the hardware of the server 130 may basically have the same configuration as that of the personal computer 100.

7. Pre-Processing

In order to achieve the above-described mashup, in general, it is necessary that original music A and original music B have the same tempo, key, and beat position. However, any of the original music A and original music B often do not have the same tempo, key, and beat position. Also, it is sometimes more effective to change the tempo and the key of the mashup-result music.

Accordingly, the tempo and the key of the original music is changed, and this change can be executed by the player i. For example, as disclosed in Japanese Patent Application No. 2004-269085, etc., it is possible to detect the tempo and the beat of the original music from the level and a peak of the sound volume of the original music. That is to say, it is possible to detect the tempo and the beat of the original music from the level and a peak of the sound volume of the original music. Then, the tempo should be adjusted such that the beat start position (that is to say, the start position of a bar) of one piece of the original music or a desired piece of mashup-result music and the beat start position of the other piece of the original music are performed with the same timing, and further key-matching (modulation) processing should be performed.

Figure 13:
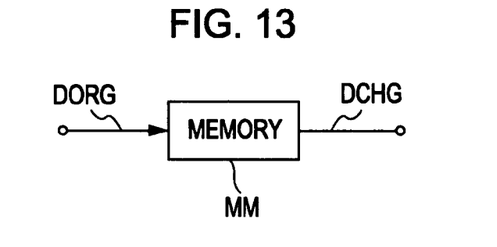
FIG. 13 is a schematic diagram illustrating an example of a pre-processing method.
Figure 14:
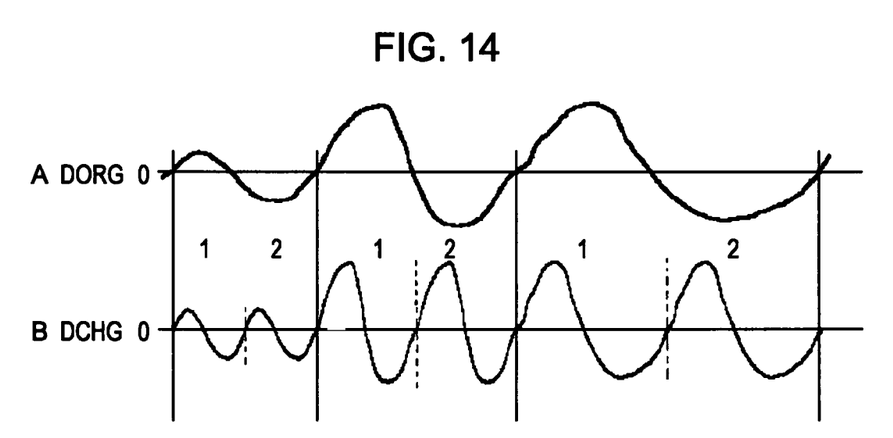
FIG. 14 is a waveform chart illustrating an example of a pre-processing method.

Also, for example as shown in FIG. 13 and FIG. 14A, if digital audio data DORG of the original music is written into the memory MM in sequence for each sample, and as shown in FIG. 14B, the written data DORG is thinned, for example by a ratio of one sample out of two samples, and the sample is repeatedly read twice for each predetermined period, the read digital audio data DCHG comes to have a frequency two times the frequency of the original music. That is to say, the data becomes one octave higher.

Accordingly, it is possible to change the tempo and the key to target values by setting the ratio of thinning when the digital audio data DCHG is read from the memory MM, or by setting the number of repetitions.

8. Summary

By the above-described system, it is possible to carry out a mashup without having special knowledge for a mashup. Alternatively, it is possible to further expand a mashup music by reprocessing the recipe and the mashup music. Also, it is possible to distribute the mashup music through a network free of charge or with a charge.

In that case, the original pieces of music A and B are provided by the user who is going to listen to mashup music, and the original pieces of music A and B are only played back in accordance with a recipe. Thus, there is little possibility that the copy right is infringed. It would be rather possible to contribute to the sales of the original music, because it is meaningless to obtain only a recipe. For example, it is possible to mash up music of the past with a recent hit music in order to enjoy a brand new piece of music. Thus, the music of the past, which is less contributing to sales at present, may attract attention again by this mashup system, and may contribute to sales.

9. Others

In the above description, when the music A is, for example a solo, if the music B is a combination scales performed by various instruments and chords, it is possible to add an accompaniment to the music A. Alternatively, one of the pieces of music A and B may be a various sound effect. Also, it is possible to assume that B=A where A and B are pieces of music, that is to say, it is possible to carry out a mashup using only the blocks of the music A.

Furthermore, in the above, descriptions has been given of the cases where a plurality of pieces of music A and B are mashed up. However, this invention can be applied to the case where a plurality of contents are mashed up. For example, the invention can be applied to the case where a plurality of moving images are mashed up, the case where music, sound, sound effect, and the like are added to a moving image, and the case where a plurality of sentences are mashed up, etc. Also, it is possible to simultaneously perform processing, such as reverberation, echo, and equalizer, etc.

It should be understood by those skilled in the art that various modifications, combinations, sub-combinations and alterations may occur depending on design requirements and other factors insofar as they are within the scope of the appended claims or the equivalents thereof.

What is claimed is:

1. A method of distributing mashup data, the method comprising:

distributing to a user a part of mashup music to allow a trial playback thereof, in which the mashup music is formed by mashing up at least a first music content and a second music content;

determining whether the user purchased a recipe corresponding to the mashup music after the trial playback, in which the recipe does not include actual music of the first music content and the second music content; and when the user purchases the recipe, enabling the user to purchase at least one of the first music content and the second music content, in which a tempo of at least one of the first music content and the second music content is adjusted so that beat start positions of the first and second music contents are performed with the same timing, and in which the recipe includes original music information to be used for mashup which is (i) indicative of original tempo, beat, and modulation of the first music content and the second music content in their original forms, (ii) indicative of a start point or end point of a respective bar or bars of a respective block or blocks of the first music content and the second music content in their original forms, and (iii) indicative of a position of a beginning of a bar immediate before the start point and a position of a beginning of a bar immediate before the end point of a respective block or blocks of the first music content and the second music content in their original forms, and in which the recipe further includes information on a mashup music result.

2. A system of distributing mashup data, the system comprising:

means for distributing to a user a part of mashup music to allow a trial playback thereof, in which the mashup music is formed by mashing up at least a first music content and a second music content;

means for determining whether the user purchased a recipe corresponding to the mashup music after the trial playback, in which the recipe does not include actual music of the first music content and the second music content; and means, when the user purchases the recipe, for enabling the user to purchase at least one of the first music content and the second music content, in which a tempo of at least one of the first music content and the second music content is adjusted so that beat start positions of the first and second music contents are performed with the same timing, and in which the recipe includes original music information to be used for mashup which is (i) indicative of original tempo, beat, and modulation of the first music content and the second music content in their original forms, (ii) indicative of a start point or end point of a respective bar or bars of a respective block or blocks of the first music content and the second music content in their original forms, and (iii) indicative of a position of a beginning of a bar immediate before the start point and a position of a beginning of a bar immediate before the end point of a respective block or blocks of the first music content and the second music content in their original forms, and in which the recipe further includes information on a mashup music result.

* * * * *